United States Patent [19]

Sowle et al.

[11] Patent Number: 5,014,650
[45] Date of Patent: May 14, 1991

[54] ANIMAL LITTER

[75] Inventors: Cynthia W. Sowle, Mt. Pleasant; Stephen W. Tobey, Midland, both of Mich.

[73] Assignee: DowBrands Inc., Indianapolis, Ind.

[21] Appl. No.: 458,197

[22] Filed: Dec. 28, 1989

[51] Int. Cl.⁵ .................................. A01K 1/015
[52] U.S. Cl. .................................. 119/171
[58] Field of Search ............... 119/1, 171, 172, 173

[56] References Cited

U.S. PATENT DOCUMENTS

| | | | |
|---|---|---|---|
| 4,009,684 | 3/1977 | Kliment et al. | 119/1 |
| 4,315,761 | 2/1982 | Larrson et al. | 119/1 |
| 4,494,482 | 1/1985 | Arnold | 119/1 |
| 4,506,628 | 3/1985 | Stockel et al. | 119/1 |
| 4,517,919 | 5/1985 | Benjamin et al. | 119/1 |
| 4,657,881 | 4/1987 | Crampton et al. | 119/1 |
| 4,685,420 | 8/1987 | Stuart | 119/1 |

*Primary Examiner*—Robert P. Swiatek
*Assistant Examiner*—Todd E. Manahan

[57] ABSTRACT

Disclosed is an animal litter comprising a porous, inert solid substrate and a dry, particulate cellulosic ether. When animal urine contacts the animal litter there are produced gelled agglomerates containing the animal urine, polymer, and solid substrate. The gelled agglomerates have sufficient mechanical integrity to be conveyed as discrete entities thereby permitting animal urine to be physically removed from the litter box.

7 Claims, 1 Drawing Sheet

ANIMAL LITTER

BACKGROUND OF THE INVENTION

This invention relates to an animal litter which forms a gelled agglomerate of the litter material and urine upon moistening of the material by the animal. The gelled agglomerates can easily be removed manually or with a simple implement such as a scoop.

Animal litters are in common use around the household for purposes of removing animal waste products and minimizing odor of such waste products. Periodically, physical removal of contaminated litter material is necessary. With conventional litters, physical removal of waste products often necessitates removal of the entire litter composition. Such physical removal can be unpleasant, time consuming, and expensive.

Excellent teachings directed to cat litters are seen in Stuart, U.S. Pat. No. 4,685,420, which has the same assignee as the present application, and is incorporated herein by reference. Stuart teaches an animal litter comprising a porous, inert solid substrate and a dry, particulate water-absorbent polymer. When animal urine contacts the litter of Stuart, the urine is absorbed by the water absorbent polymer and porous substrate to form a neat, gelled agglomerate of urine, polymer, and substrate particles. The gelled agglomerate has sufficient mechanical integrity such that it can be removed by itself from the litter box manually or by scooping. The litter remaining in the litter box after removal of the gelled agglomerates is clean and useful. According to Stuart, particularly preferred water-absorbent polymers include polymers produced by polymerization of at least one monomer selected from the group consisting of acrylic acid, methacrylic acid and alkali metal salts of acrylic acid and methacrylic acid.

Crampton et al., U.S. Pat. No. 4,657,881 relates a litter comprising compacted particles of a solid substrate and an additive. This additive may be capable of gelling or thickening water, and may be a water soluble polymer such as a cellulosic ether. The additive and the substrate, which is preferably clay fines, are mixed together and compacted into particles. Crampton et al. teaches that the addition of the additive markedly increases the absorbency of the compacted particles over that of substrate alone.

Arnold, U.S. Pat. No. 4,494,482, relates a solid absorbent pad for use in animal litter boxes. The pad utilizes a composition of a solid absorbent material and a water-insoluble organic or inorganic hydrogel. Urine deposited on the absorbent pad is absorbed therein. Suitable organic hydrogels include polyacrylates, hydroxypropylcellulose, and carboxymethylcellulose. The absorbent material and hydrogel is effectively encased by means such as tissue paper, polyethylene film, rayon sheeting, and nylon screen preventing removal of the urine.

Accordingly, there exists a need for an animal litter wherein urine is not only absorbed by the substrate particles, but is removable therefrom without disposing of the entire contents of the litter. Further, there exists a need for a litter utilizing additional types of water absorbent polymers wherein the urine is absorbed by the substrate and the polymer to form a gelled agglomerate having sufficient mechanical integrity such that the agglomerate can be removed from the litter box.

BRIEF DESCRIPTION OF THE DRAWING

The novel features of the present invention and the context within which they are set will be better understood upon reviewing the following specification together with the drawing.

SUMMARY OF THE INVENTION

Figure 1:
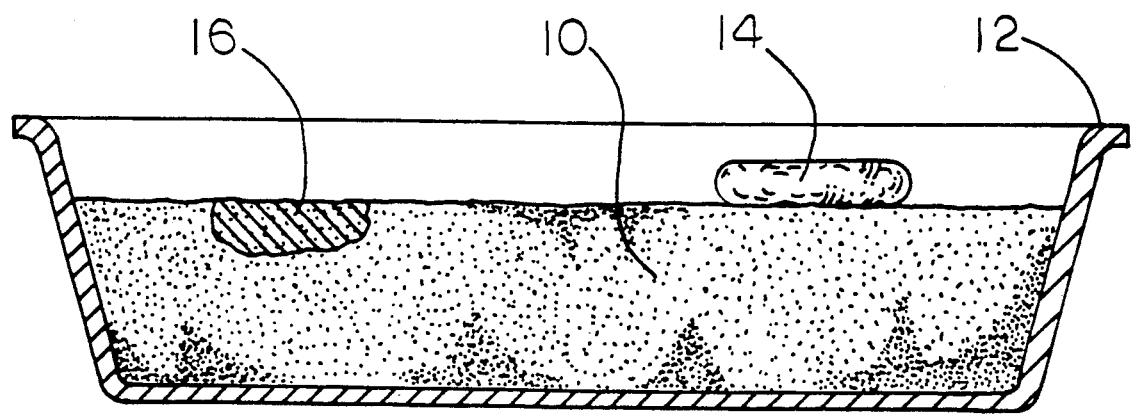
FIG. 1 is a cross-sectional view of a litter box containing the animal litter of the present invention, the animal litter having a gelled agglomerate formed by deposit of urine thereon.

The animal litter of the present invention comprises a porous, inert solid substrate and a dry, particulate, cellulosic ether in an amount sufficient to agglomerate the animal urine deposited in the litter box and thereby form a gelled agglomerate having sufficient mechanical integrity to be conveyed from the litter box as a discrete entity.

In a preferred embodiment of the litter of the present invention, the cellulosic ether comprises from about 0.01 to about 5.0 percent by weight based upon the weight of the substrate. In a more preferred embodiment of the litter of the present invention, the cellulosic ether comprises from about 0.2 to about 2.0 percent by weight based upon the weight of the substrate. In a most preferred embodiment of the litter of the present invention, the cellulosic ether comprises from about 0.5 to about 1.5 percent by weight based upon the weight of the substrate.

In a preferred embodiment of the litter of the present invention, the cellulosic ether comprises methylcellulose. In another preferred embodiment, the cellulosic ether comprises hydroxypropyl methylcellulose. In yet another preferred embodiment, the cellulosic ether comprises hydroxybutyl methylcellulose.

DETAILED DESCRIPTION OF THE INVENTION

Referring now to FIG. 1, there is shown an animal litter 10 of the present invention. Animal litter 10 is contained in a litter box 12. Urine which has been deposited in litter 10 forms a gelled agglomerate or shaped solid 16. Feces 14 may be concurrently deposited on litter 10 with the urine.

It is common practice for a homeowner to remove feces from the litter box daily or more often. With animal litter 10 of the present invention, the homeowner can also easily remove one or more gelled agglomerates 16, and in this manner physically remove the urine from litter 10. Physical removal of gelled agglomerates 16 allows reuse of uncontaminated portions of litter 10 and elimination of a source of unpleasant odors.

Animal litter 10 comprises a porous, inert solid substrate and a dry particulate water-absorbent polymer of a type additional to those disclosed in Stuart. When an animal urinates on animal litter 10, the urine is absorbed by the water absorbent polymer as well as by the porous substrate, and forms gelled agglomerate 16 of water absorbent polymer, urine, and substrate. Polymers useful in animal litter 10 exhibit a degree of gel strength after absorption of the urine sufficient to permit removal of urine from a litter box in the form of a coherent gelled agglomerate 16 of the urine and the litter material. Useful polymers are preferably capable of absorbing many times their own weight of an aqueous fluid such as urine. Gelled agglomerate 16 has sufficient mechanical integrity to be conveyed from litter box as a discrete entity using methods typically used in removing waste product from a litter box such as with implements or manually by hand.

Formation of gelled agglomerate 16 of the substrate, polymer, and urine is predicated upon a number of physical properties of the particulate water-absorbent polymer including solution viscosity, degree of cross-linking, molecular weight, and extent of chain substitution (e.g., methoxyl substitution in methylcellulose). Though the above-enumerated physical properties may affect the degree of absorption of the polymer as well as the degree of agglomeration, absorption and agglomeration are not interdependent. Thus, a polymer may be absorptive without being agglomerative. A polymer must be agglomerative to be efficacious in litter 10.

The dry, particulate water absorbent polymers useful in animal litter 10 are believed to effect agglomeration of the substrate, polymer, and urine in a manner substantially similar to those of the litter of U.S. Pat. No. 4,685,420, which has the same assignee as the present application. Animal litter 10 utilizes types of particulate, water-absorbent polymers additional to those disclosed in Stuart, U.S. Pat. No. 4,685,420.

The additional particulate, water absorbent polymers useful in litter 10 of the present invention include polyvinyl alcohol, xanthan gum, gum acacia and various water soluble polysaccharides such as cellulosic ethers, alginates, or starches. Particularly preferred water absorbent polymers are the water soluble cellulosic ethers such as methylcellulose, carboxymethylcellulose, hydroxypropylmethylcellulose, hydroxybutylmethylcellulose, and hydroxypropylcellulose. Preferred commercially available water absorbent polymers are Methylcellulose A4M and Hydroxypropylmethylcellulose J15MS, K4M, and K15M, all of which are marketed by The Dow Chemical Company.

The particulate, water absorbent polymer is employed in combination with the substrate in any amount sufficient or necessary to bind the urine, and preferably is present in litter 10 at from about 0.1 to about 5.0 and more preferably from about 0.2 to about 2.0 and most preferably about 0.5 to about 1.5 percent by weight based on the weight of the substrate.

Examples of suitable porous, inert solid substrates useful in the present invention include among others wood chips, wood shavings, wood flour, sawdust, straw, clay, porous beads such as those of polyethylene, polypropylene or polystyrene, shredded paper, cloth, alfalfa, cotton, sand, bark, ground corn husk, ground sugar cane, lignocellulose, cellulose, calcium silicate and calcium sulfate. Particularly preferred porous, inert solid substrates are clays such as kaolinite, attapulgite, montmorillonite, etc.

The porous, solid substrate is usually particulate and preferably has a particle size of from about 0.1 to about 10.0 millimeters and most preferably from about 0.1 to about 5 millimeters.

Animal litter 10 is produced preferably by dry blending the water absorbent polymer and the porous solid substrate.

Animals with which the present animal litter may advantageously be employed includes among others household pets such as cats, dogs, gerbils, guinea pigs, mice, hamsters as well as other pets such as rabbits, skunks, monkeys, horses, cows, and sheep. The present animal litter is especially useful for cats.

Animal litter 10 can additionally comprise ingredients such as perfumes, deodorants, odor absorbents, antimicrobial agents, disinfectants, colorants, and pesticides.

It will be appreciated that the invention may be modified by various changes while still being fairly within the scope of the general teaching and principles hereof.

The following Example is designed to teach those skilled in the art how to practice the invention, and is not to be construed as limiting.

EXAMPLE 2.60 grams of Methocel A4M powder (marketed by The Dow Chemical Co.) was dry blended with 254.6 grams of a commercially available granulated clay cat litter. The blend was contained in a Ziploc brand sandwich bag (marketed by DowBrands Inc.) such that the mass of the blend assumed a roughly hemispherical volume 3.5 inches in diameter and 2.5 inches deep. 25 milliliters of artificial urine were poured upon the exposed upper surface of the blend. The artificial urine was prepared by mixing 2.1 milliliters of 28 percent by weight aqueous ammonia, 50.4 grams of urea, 4.3 grams of $CaCl_2 \cdot 2H_2O$, and 500 milliliters of water. Upon pouring the artificial urine upon the exposed upper surface, a darkened, wetted zone roughly 2 inches in diameter and 1 inch deep was formed. Upon standing for 5 minutes, the wetted zone had agglomerated to form a cohesive, moist patty which resisted crumbling when disturbed and could be readily removed or conveyed from the remaining blend as a discrete entity either with a litter scoop or by hand. Tests performed with blends utilizing the same substrate with Methocel A4M in percentages of 0.3, 0.5, and 0.7 by weight of the substrate at substantially similar test conditions resulted in cohesive, moist patties removable as a discrete entity from their respective bag containers.

Positive results were also obtained in separate tests utilizing each of 5% Methocel XD30345.15, 5% hydroxypropylmethylcellulose J12MS, 5% hydroxypropylmethylcellulose J20MS, 1% hydroxypropylmethylcellulose K15M, 1% hydroxypropylmethylcellulose K4M, 0.5% hydroxybutylmethylcellulose HB11M at substantially similar test conditions and with the same substrate material as above. The results were positive in that gelled agglomerates of mechanical integrity sufficient to be conveyed from the bag container were formed. All of the polymers enumerated above are marketed by The Dow Chemical Company. All of the above percentages are based on weight of the polymer versus weight of the substrate.

Negative results were obtained in separate tests utilizing each of 0.5% Methocel A15LV Premium and 0.5% Methocel J5MS at substantially similar test conditions and with the same substrate material as above. The results were negative in that gelled agglomerates of mechanical integrity sufficient to be conveyed from the bag container were not formed. The Methocel A15LV Premium is believed to have given a negative result because it does not form a cohesive gel structure at that concentration. The Methocel J5MS is believed to have given a negative result because it gels at a pH of from about 8.5 to about 10 and does not form a cohesive gel at that concentration. Since the artificial urine is less basic than the 8.5 level, gel structure is less than cohesive. The polymers enumerated above are marketed by The Dow Chemical Company. The above percentages are based on weight of the polymer versus weight of the substrate.

What is claimed is:

1. An animal litter capable of agglomerating animal urine to facilitate removal of the animal urine from the litter box containing the animal litter, said animal litter comprising:

(a) a particulate, porous, inert solid substrate; and
   (b) a dry, particulate, cellulosic ether having sufficient intrinsic gel-forming capability sufficient to and being present in an amount sufficient to agglomerate animal urine deposited in the litter box and thereby form a gelled agglomerate having sufficient mechanical integrity to be conveyed from the litter box as a discrete entity.

2. The animal litter of claim 1 wherein the cellulosic ether comprises from about 0.1 to about 5.0 percent by weight based upon the weight of the substrate.

3. The animal litter of claim 1 wherein the cellulosic ether comprises from about 0.2 to about 2.0 percent by weight based upon the weight of the substrate.

4. The animal litter of claim 1 wherein the cellulosic ether comprises from about 0.5 to about 1.5 percent by weight based upon the weight of the substrate.

5. The animal litter of claim 1 wherein the cellulosic ether is methylcellulose.

6. The animal litter of claim 1 wherein the cellulosic ether is hydroxypropyl methylcellulose.

7. The animal litter of claim 1 wherein the cellulosic ether is hydroxybutyl methylcellulose.

* * * * *